United States Patent
Saldhana

(10) Patent No.: US 9,069,638 B2
(45) Date of Patent: Jun. 30, 2015

(54) UPDATE SYSTEM TO SYNCHRONIZE CHANGES FROM EXTERNAL SOURCES FOR A JAVA VIRTUAL MACHINE

(75) Inventor: Anil Saldhana, Oak Park, IL (US)

(73) Assignee: Red Hat, Inc., Raleigh, NC (US)

( * ) Notice: Subject to any disclaimer, the term of this patent is extended or adjusted under 35 U.S.C. 154(b) by 1599 days.

(21) Appl. No.: 11/761,186

(22) Filed: Jun. 11, 2007

(65) Prior Publication Data

US 2008/0307408 A1    Dec. 11, 2008

(51) Int. Cl.
*H04L 29/00* (2006.01)
*G06F 9/445* (2006.01)

(52) U.S. Cl.
CPC .......................... *G06F 8/65* (2013.01)

(58) Field of Classification Search
CPC ................................. G06F 9/44; G06F 17/30
USPC .......................... 711/130; 709/217
See application file for complete search history.

(56) References Cited

U.S. PATENT DOCUMENTS

| | | | |
|---|---|---|---|
| 5,919,247 A * | 7/1999 | Van Hoff et al. | 709/217 |
| 6,772,206 B1 * | 8/2004 | Lowry et al. | 709/223 |
| 6,922,695 B2 * | 7/2005 | Skufca et al. | 1/1 |
| 7,590,863 B2 * | 9/2009 | Lambert | 713/189 |
| 8,607,332 B2 * | 12/2013 | Canard et al. | 726/20 |
| 2003/0065826 A1 * | 4/2003 | Skufca et al. | 709/315 |
| 2003/0220990 A1 | 11/2003 | Narayanan et al. | |
| 2006/0047813 A1 | 3/2006 | Aggarwal et al. | |
| 2006/0248276 A1 * | 11/2006 | Kilian et al. | 711/130 |
| 2007/0288588 A1 | 12/2007 | Wein et al. | |
| 2008/0066166 A1 | 3/2008 | Childs et al. | |
| 2011/0066935 A1 * | 3/2011 | Sinha et al. | 715/234 |
| 2012/0296873 A1 | 11/2012 | Saldhana | |

OTHER PUBLICATIONS

Anil Saldhana, "Systems and Methods for Updating and Synchronizing Changes to Security Caches", U.S. Appl. No. 13/112,448, filed May 20, 2011.
USPTO; Office Action for U.S. Appl. No. 13/112,448, mailed Mar. 15, 2013.

* cited by examiner

*Primary Examiner* — Brandon Hoffman
*Assistant Examiner* — Michael D Anderson
(74) *Attorney, Agent, or Firm* — Lowenstein Sandler LLP

(57) ABSTRACT

Embodiments of the present invention provide a security cache update mechanism for J2EE where changes to external sources affecting information in the security cache are automatically propagated into the security cache. In some embodiments, the update mechanism utilizes a standards based mechanism, such as a Service Provisioning Markup Language (SPML) exchange, to propagate changes at these external sources.

19 Claims, 3 Drawing Sheets

UPDATE SYSTEM TO SYNCHRONIZE CHANGES FROM EXTERNAL SOURCES FOR A JAVA VIRTUAL MACHINE

DESCRIPTION OF THE INVENTION

1. Field of the Invention

The present invention relates to computer security, and more particularly, it relates to maintaining a security cache current.

2. Background of the Invention

Java Platform, Enterprise Edition, Java EE, or J2EE is a widely used platform for server programming in the Java language. A J2EE container is a runtime entity that provides services to specialized Java components. Services provided by a container typically include life cycle management, security, deployment and component-specific services. Containers are used in a wide variety of Java components, such as Enterprise Javabeans (EJB), Web pages, Java Server Pages (JSP), servlets, applets, and application clients.

For security information, J2EE containers typically cache their security cache in the Java Virtual Machine (JVM) to avoid round trip latency to third party sources like a database or a directory service. But when these sources change information (like password changes, role changes), the security cache can become inconsistent with what is current.

Typically, J2EE containers employ a timeout feature to attempt to keep their security cache current. However, timeouts are generally insufficient in keeping security caches current in dynamic environments.

Accordingly, it may be desirable to provide methods and systems that allow J2EE containers to keep their security caches more current.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a security cache update mechanism for J2EE where changes to external sources affecting information in the security cache are automatically propagated into the security cache. Such external sources may any system that provides information cached in a Java application. For example, a directory server or other type of database server may be the source of information in the J2EE security cache that requires provisioning of updates. In some embodiments, the update mechanism utilizes a standards based mechanism, such as a Service Provisioning Markup Language (SPML) exchange, to propagate changes at these external sources.

Reference will now be made in detail to the exemplary embodiments of the invention, which are illustrated in the accompanying drawings. Wherever possible, the same reference numbers will be used throughout the drawings to refer to the same or like parts.

Figure 1:
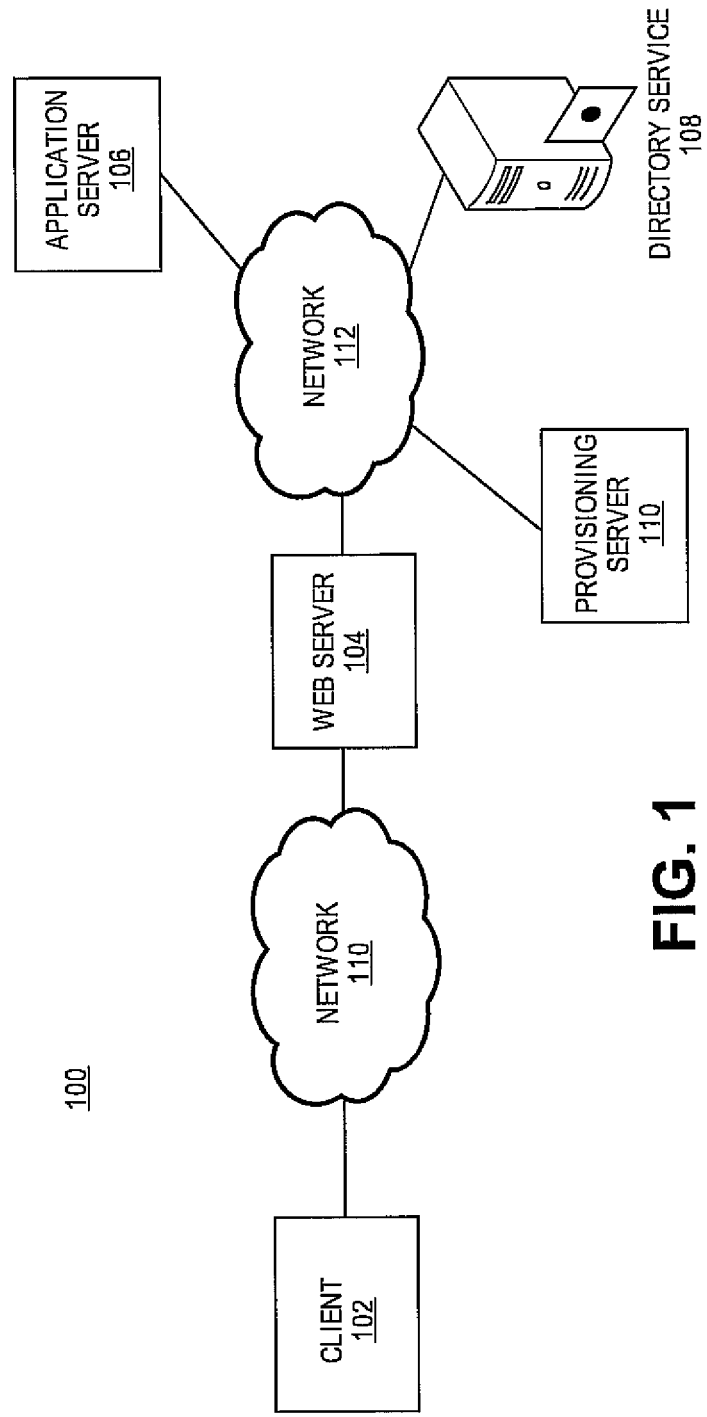
FIG. 1 illustrates an exemplary system in which the present invention may be implemented.

FIG. 1 illustrates an exemplary system 100 in which the present invention may be implemented. To help explain the principles of the present invention, system 100 is shown configured as a typical web application and where users must be authenticated. Accordingly, as shown, system 100 may comprise a client 102, a web server 104, an application server 106, a directory service 10s, and a provisioning server 110. These components are coupled together via networks 112 and 114 respectively. Each of these components will now be further described.

Client 102 may be any computer system that utilizes the services of another computer system, i.e., web server 104 and application server 106. As shown in FIG. 1, client 102 may be implemented using components well known to those skilled in the art, such as a personal computer, laptop computer, personal digital assistant, a mobile phone, and the like. In the embodiments shown in FIG. 1, client 102 may be used to run Web applications via an application, such as web browser.

Web server 104 is computer system that accepts requests from clients, such as client 102, and serving responses along with optional data contents. In the embodiment shown, this content served by web server 104 is usually one or more Web pages that includes hypertext markup language (HTML) documents and linked objects (images, video, audio, etc.).

Web server 104 may be implemented on a machine that comprises well known hardware and software. Well known software for web server 104 may be software, such as Apache HTTP Server from the Apache Software Foundation, Internet Information Services by Microsoft Corporation, and Sun Java System Web Server from Sun Microsystems Inc. One skilled in the art will recognize that any of the many different Web server programs available are consistent with the principles of the present invention.

Application server 106 is software that provides applications to client 102. Application server 106 may be configured to handle security, business logic, data access for the applications provided to the client 102. Application server 106 may provide a variety of Web-based applications, such as e-commerce applications, content management applications, customer relations management applications, and the like.

Application server 106 may be implemented on various software platforms. For example, application server 106 may be implemented on the well known J2EE platform from Sun Microsystems Inc. In addition, application server 106 may comprise middleware to enable applications to intercommunicate with dependent applications, like web server 104, database management systems, etc.

Application server 106 may be implemented using well known software. For example, application server 106 may be implemented using software, such WebLogic server from BEA Systems Inc., JBoss from Red Hat Inc., Websphere from the IBM Corporation, and the like.

Accordingly, application server 106 may implement the Java programming language and provide Web modules using servlets and JavaServer pages. Other functions of application server 106 may also employ Java. For example, business logic provided by application server 106 may be built into Enterprise JavaBeans (EJBs). J2EE provides standards for containing the Web components. Security services, such as authentication and authorization, may be implemented using the Java Authentication and Authorization Service (JAAS) or similar service.

Directory service 108 represents the components that store and organize information about the users of system 100 and an administrator of system 100 to manage those users' access to the resources of system 100. Directory service 108 may comprise a database (not shown) that holds information about named objects that are managed. Directory service 108 also provides the access interface to the data that is contained in this database. Directory service 108 may be implemented using well known technologies. For example, directory service 108 may be implemented as a X.509 directory service or Lightweight Directory Access Protocol (LDAP) service.

There are several well known directory service implementations from various vendors. Among them are: Red Hat Directory Server from Red Hat Inc.; Active Directory by the Microsoft Corporation; Apache Directory Server by the Apache Software Foundation; and Sun Java System Directory Server by Sun Microsystems Inc.

Provisioning server 110 is software that listens for provisioning requests in system 100 and returns provisioning responses. In some embodiments, provisioning server 110 is configured as a SPML provisioning service provider. Provisioning server 110 may be implemented as a separate software component of system 100 or may be integrated with other components of system 100. For example, provisioning server 110 may be a component that is installed as part of directory server 108.

Network 112 represents the communications infrastructure for allowing client 102 and web server 104 to communicate with each other. For example, network 112 may represent the Internet, which is a worldwide, publicly accessible network that uses the Internet Protocol (IP) suite of standards.

Network 114 represents the communications infrastructure that allows web server 104, application server 106, directory service 108, and provisioning server 110 to communicate with each other. Network 114 may be implemented as a local area network or may utilize one or more larger networks, such as the Internet.

Figure 2:
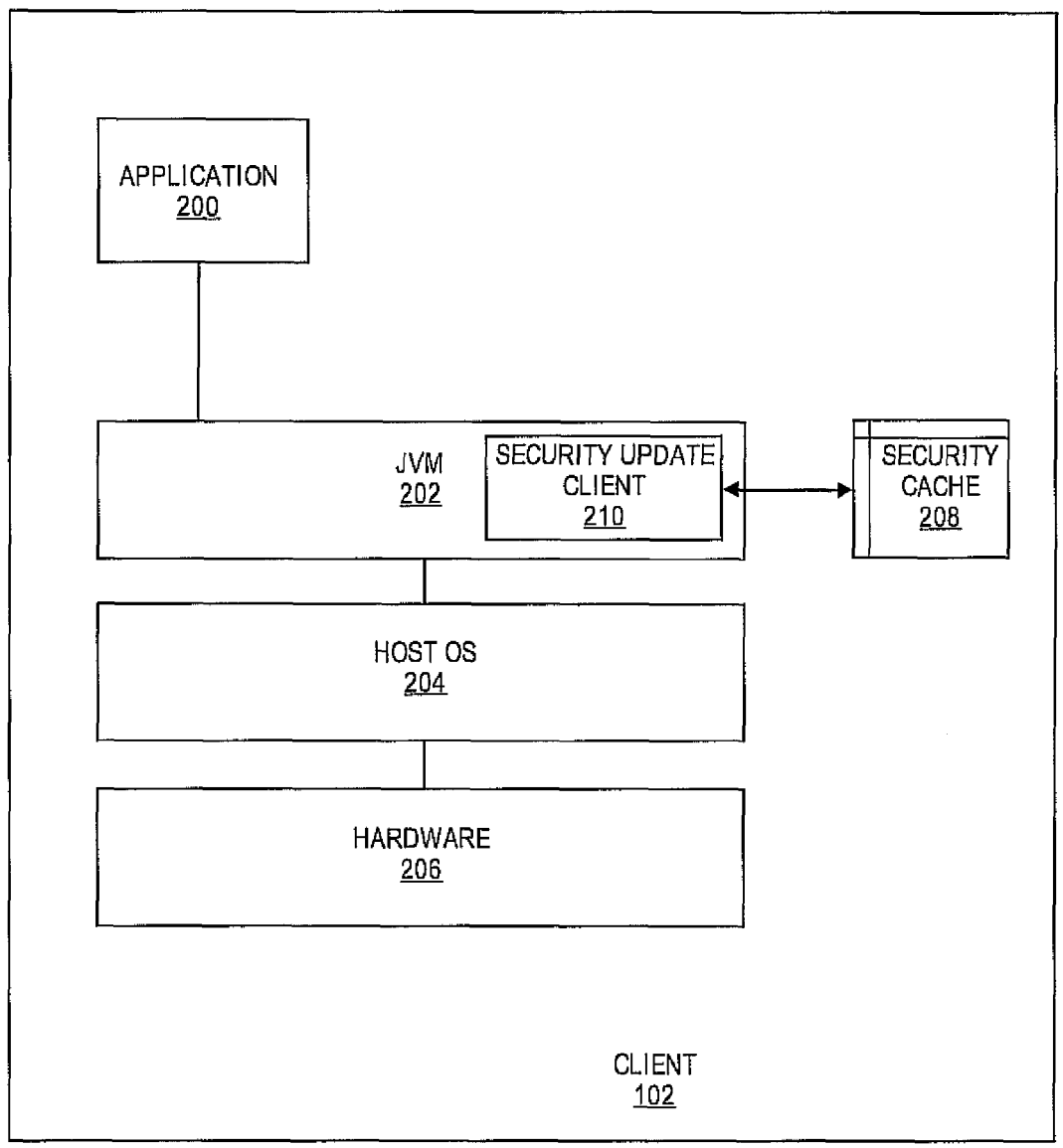
FIG. 2 illustrates an exemplary software architecture for implementing the present invention.

FIG. 2 illustrates an exemplary software architecture for implementing the present invention. In particular, an exemplary software architecture of application client 102 is shown. As shown, client 102 may comprise an application 200 running on a Java Virtual Machine (JVM) 202. Client 102 further comprises a host operating system (OS) 204 and hardware 206.

Application 200 refers to the software that requests services and access to resources of system 100. Typically, application 200 may be an application, such as a web browser, that runs on client 102 and connects to web server 104 as necessary. In some embodiments, application 200 represents any application that utilizes Java.

Java Virtual Machine (JVM) 202 is a set of computer software programs and data structures which implements the Java virtual machine on client 102. JVM 202 interprets the Java bytecode and executes the code for application 200. JVM 202 may be implemented using the well known JVM standard, which is published by Sun Microsystems, Inc.

Security cache 208 is a block of memory for temporary storage of security data likely to be used again by JVM 202. Security cache 208 may be configured as a pool of entries, which each have a tag indicating the identity of the source of the data stored. Typically, security cache 208 is used for caching authentication information. Security cache 208 may be configured with various properties to control its behavior. For example, JVM 202 may specify the initial size of security cache 208, as well as the frequency or timeout of when security cache 208 should be refreshed.

Security update client 210 represents provisioning interface for updating the contents of security cache 208. In some embodiments, security update client 210 is a SPML-compliant service that utilizes provisioning service 110 for updates to security cache 208. Of note, in order to secure the provisioning of updates to security cache 208, security update client 210 may establish trust relationships with provision service 110 and directory service 108. The details of establishing and maintaining this trust relationship are well known to those skilled in the art and are beyond the scope of this specification.

Host operating system (OS) 204 is the set of programs that manage the hardware and software resources of client 102. Several implementations of OS 204 are well known to those skilled in the art. For example, operating systems, such as Windows from the Microsoft Corporation, Mac OS from Apple Corporation, and LINUX from Red Hat Inc. are well known.

Hardware 206 represents the physical components of client 102. Such components, including the processor, memory, disk drive, and the like, are well known to those skilled in the art.

Figure 3:
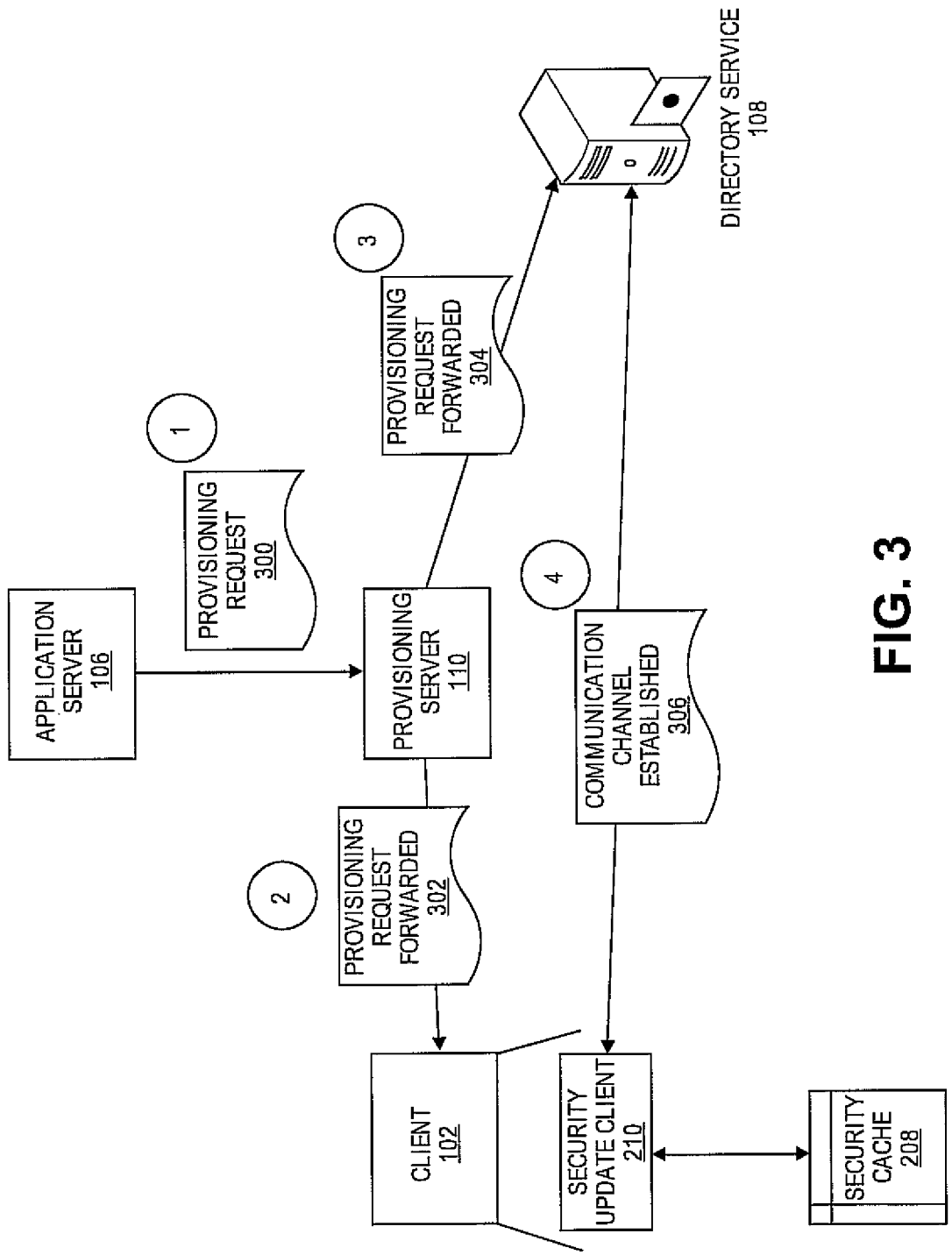
FIG. 3 illustrates an exemplary process flow for implement the present invention.

FIG. 3 illustrates an exemplary process flow for implementing the present invention. In general, application server 106 establishes a provisioning service with provisioning server 110 using a set of requests for updates to security cache 208 at client 102. For example, this request may be in the form of a SPML document for authentication information from directory service 108 or some other type of security information. Provisioning server 110 then takes the operations specified within the SPML document and executes provisioning actions against security cache 208.

In this example shown, provisioning server 110 may consider directory service 108 as a resource and the security cache 208 in client 102 as a provisioning service target. The process flow for provisioning updates to security cache 208 in client 102 will now be further described.

In phase 300, application server 106 constructs an SPML document subscribing client 102 to the provisioning service offered by provisioning server 110. The SPML document specifies the characteristics of the provisioning service. Such characteristics include whether updates should occur synchronously or asynchronously, the schema of data being updated, whether updates should be batch or individually processed, identity of the source of updates, and identity of the update target.

In phase 302, provisioning server 110 provisions the update service at client 102. In particular, provisioning server 110 takes the data passed in the SPML document from application server 106, constructs its own SPML document and sends it to security update client 210 at client 102.

In phase 304, in order to fully service the request by application server 106, provisioning server 110 also forwards the SPML document to directory service 108. In response, directory service 108 identifies the subject of the provisioning request in the SPML document and establishes a data set for updates.

In phase 306, security update client 210 opens a connection with security update client 210. For example, this connection may be a Java JDBC or ODBC connection with directory service 108. JDBC and ODBC are well known application programming interfaces of Java. Such connections provide methods for querying for updates in authentication information in directory service 108. Accordingly, whenever changes are made in directory service 108, they will automatically be propagated to security update client 210 and security cache 208.

Other embodiments of the invention will be apparent to those skilled in the art from consideration of the specification and practice of the invention disclosed herein. For example, instead of application server 106, client 102 or directory service 108 may be the initial requester for provisioning updates to the security cache at client 102. In addition, protocols other than SPML may be employed by the present invention. For example, any form of extensible markup language (XML) protocol is consistent with the present invention. It is intended that the specification and examples be considered as exemplary only, with a true scope and spirit of the invention being indicated by the following claims.

What is claimed is:

1. A method, comprising:
   receiving, at a processor of a provisioning server from an application server, a subscription request, wherein the application server is to serve an application to a client, wherein the subscription request comprises a document that specifies a characteristic of a provisioning service;
   generating, by the processor, an update request in view of the characteristic of the provisioning service;
   forwarding, by the processor, the update request to a Java security update module of the client, wherein the Java security update module is to communicate with a Java container, wherein the Java container comprises a security cache; and
   forwarding, by the processor, the update request to a directory server hosting updated security data, wherein the directory server is to send the updated security data to the Java security update module for storage in the Java container.

2. The method of claim 1, wherein the Java security update module and the directory server are to communicate with one another in view of exchanging extensible markup language information.

3. The method of claim 1, wherein the Java security update module and the directory server are to communicate with one another in view of exchanging service provisioning markup language information.

4. The method of claim 1, wherein the updated security data comprises data that affects authentication information in the Java container.

5. The method of claim 1, wherein the Java security update module and the directory server are to communicate with one another synchronously.

6. The method of claim 1, wherein the Java security update module and the directory server are to communicate with one another asynchronously.

7. An apparatus comprising means for performing the operations of claim 1.

8. A non-transitory computer readable medium comprising computer executable code for performing the method of claim 1.

9. A system, comprising:
   a processor of a provisioning server to receive a subscription request from an application server, wherein the subscription request comprises a document that specifies a characteristic of a provisioning service, to generate an update request in view of the characteristic of the provisioning service, and to forward the update request to an update module of a client, wherein the application server is to serve a Java application to the client, and wherein the update module of the client comprises a container that comprises a security cache for the Java application; and
   a directory server to receive the update request forwarded from the provisioning server, to host updated security data, and to send the updated security data to an update module of the client for storage in the container.

10. The system of claim 9, wherein processor is further to establish a communication channel with the directory server in response to forwarding the update request to the update module.

11. The system of claim 9, wherein the update request is provided to the update module in an extensible markup language document.

12. The system of claim 9, wherein the update request is provided to the update module in a service provisioning markup language document.

13. The system of claim 9, wherein the update module is to update the container synchronously with updates at the directory server.

14. The system of claim 9, wherein the update module is to update the container asynchronously with updates at the directory server.

15. A method, comprising:
   receiving, by a processor and from a provisioning server, an update request at an update module of a client, wherein the update request comprises a document that specifies a characteristic of a provisioning service, wherein the update module is to communicate with a Java container, wherein the Java container comprises a security cache, and wherein the client is to run an application associated with an application server;
   establishing a communication channel with a directory server hosting updated security data in view of the characteristic of the provisioning service, wherein the directory server received the update request from the provisioning server; and
   receiving, from the directory server, the updated security data via the established communication channel, wherein the update module is to store the updated security data in the Java container.

16. A method, comprising:
   receiving, by a processor and at a directory server from a provisioning server, an update request, wherein the directory server to host updated security data, wherein the update request comprises a document that specifies a characteristic of a provisioning service;
   establishing a communication channel with an update module of a client in view of the characteristic of the provisioning service, wherein the update module received the update request from the provisioning server, and wherein the update module is to communicate with a Java container, wherein the Java container comprises a security cache; and
   transmitting the updated security data to the update module via the established communication channel, wherein the updated security data is stored in the Java container.

17. The method of claim 1, wherein the characteristic of the provisioning service comprises at least one of: whether an update is to occur asynchronously or synchronously, a schema of data being updated, whether updates are to be batch processed or individually processed, an identity of a source of the update, or an identity of an update target.

18. The method of claim 15, wherein the characteristic of the provisioning service comprises at least one of: whether an update is to occur asynchronously or synchronously, a schema of data being updated, whether updates are to be batch processed or individually processed, an identity of a source of the update, or an identity of an update target.

19. The method of claim 16, wherein the characteristic of the provisioning service comprises at least one of: whether an update is to occur asynchronously or synchronously, a schema of data being updated, whether updates are to be batch processed or individually processed, an identity of a source of the update, or an identity of an update target.

* * * * *